United States Patent
Manfred et al.

(10) Patent No.: US 8,204,635 B2
(45) Date of Patent: Jun. 19, 2012

(54) SYSTEMS AND METHODS OF REDUNDANCY FOR AIRCRAFT INERTIAL SIGNAL DATA

(75) Inventors: Mark T. Manfred, Edina, MN (US); Thomas A. Ryno, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 817 days.

(21) Appl. No.: 12/336,063

(22) Filed: Dec. 16, 2008

(65) Prior Publication Data

US 2010/0152929 A1    Jun. 17, 2010

(51) Int. Cl.
G05D 1/00    (2006.01)
(52) U.S. Cl. .............................. 701/4; 701/14; 340/945
(58) Field of Classification Search ................. 701/3, 4, 701/9, 13, 14; 340/945
See application file for complete search history.

(56) References Cited

U.S. PATENT DOCUMENTS

| | | | |
|---|---|---|---|
| 5,075,694 A * | 12/1991 | Donnangelo et al. ......... | 342/455 |
| 5,841,537 A | 11/1998 | Doty | |
| 6,161,062 A * | 12/2000 | Sicre et al. .................. | 701/3 |
| 6,473,676 B2 | 10/2002 | Katz et al. | |
| 6,671,648 B2 | 12/2003 | McCall et al. | |
| 6,955,082 B2 | 10/2005 | Adebjork et al. | |
| 7,058,505 B1 | 6/2006 | Milelli et al. | |
| 7,107,833 B2 | 9/2006 | Osborne | |
| 7,725,215 B2 * | 5/2010 | Stange et al. .................. | 701/1 |
| 2005/0150289 A1* | 7/2005 | Osborne ................... | 73/178 R |
| 2006/0167619 A1* | 7/2006 | Arethens .................. | 701/120 |
| 2006/0212182 A1* | 9/2006 | Shaw ........................ | 701/12 |
| 2011/0040430 A1* | 2/2011 | Tessier ...................... | 701/3 |

OTHER PUBLICATIONS

Crossbow Technology, Inc. Datasheet, "AHRS500 Attitude an dHeading Reference System Document Part No. 6020-0032-03 Rev C", "www.xbow.com", Apr. 15, 2008.
Ramsey, "Boeing 787: Integration'S Next Step", "Avionics Magazine—http://www.aviationtoday.com/av/categories/commercial/932.html", Jun. 1, 2005, pp. 1-4, Publisher: Access Intelligence, Inc.
Sherry et al, "Automotive-grade MEMS Sensors Used for General Aviation", "Aerospace and Electronic Systems Magazine", Oct. 2004, pp. 13-16, vol. 19, No. 10, Publisher: IEEE.
Skoogh et al., "A Method for Multiple Fault Detection and Isolation of Redundant Intertial Navigation Sensor Configurations", "2006 IEEE/ION Position, Location, and Navigation Symposium", Apr. 25-27, 2006, pp. 415-425, Publisher: IEEE. Sukkarieh et al, "A Low-Cost, Redundant Intertial Measurement Unit for Unmanned Air Vehicles", "The International Journal of Robotics Research", Nov. 2000, pp. 1089-1103, vol. 19, No. 11, Publisher: Sage Publications, Inc.

* cited by examiner

*Primary Examiner* — Thomas G. Black
*Assistant Examiner* — Shardul Patel
(74) *Attorney, Agent, or Firm* — Fogg & Powers LLC (57) ABSTRACT

An aircraft inertial system comprises at least two inertial reference units (IRU) that provide a first set of inertial signal data for an aircraft and at least two attitude heading reference systems (AHRS) that provide a second set of the inertial signal data for the aircraft. At least one primary flight display receives the first and the second sets of the inertial signal data, and a standby flight display receives at least the second set of the inertial signal data from at least one of the AHRS. When a single fault condition occurs, the primary flight display continues to operate with fail-operational redundancy from at least three independent sources of the inertial signal data comprising one or more IRU and AHRS combinations. The standby flight display will operate using a different source of the inertial signal data than the source of the inertial signal data for the primary flight display.

20 Claims, 4 Drawing Sheets

FIG. 1

| Voter Inputs | | | | | | | | | | Voter Outputs | |
|---|---|---|---|---|---|---|---|---|---|---|---|
| Inline BITE Tests Results | | | | Comparison Test Results | | | | | | | |
| IRU1 | IRU2 | AHRS1 | AHRS2 | IRU1/IRU2 | IRU1/AHRS1 | IRU1/AHRS2 | IRU2/AHRS1 | IRU2/AHRS2 | AHRS1/AHRS2 | Voted Data | Failure Warning |
| PASS | PASS | X | X | PASS | X | X | X | X | X | Average of IRU1 & IRU2 | NO |
| PASS | X | PASS | X | FAIL | PASS | X | X | X | X | IRU1 | NO |
| PASS | X | X | PASS | FAIL | X | PASS | X | X | X | IRU1 | NO |
| X | PASS | PASS | X | FAIL | FAIL | X | PASS | X | X | IRU2 | NO |
| X | PASS | X | PASS | FAIL | X | FAIL | X | PASS | X | IRU2 | NO |
| X | X | PASS | PASS | FAIL | FAIL | FAIL | FAIL | FAIL | PASS | Average of AHRS1 & AHRS2 | NO |
| FAIL | PASS | X | X | FAIL | FAIL | FAIL | FAIL | FAIL | FAIL | IRU2 | YES |
| X | X | PASS | X | FAIL | FAIL | FAIL | FAIL | FAIL | PASS | AHRS1 | YES |
| X | X | X | PASS | FAIL | FAIL | FAIL | FAIL | FAIL | PASS | AHRS2 | YES |
| FAIL | FAIL | FAIL | FAIL | FAIL | FAIL | FAIL | PASS | X | X | IRU2 | YES |
| FAIL | FAIL | FAIL | FAIL | FAIL | FAIL | FAIL | FAIL | PASS | X | IRU2 | YES |
| FAIL | FAIL | FAIL | FAIL | FAIL | FAIL | FAIL | FAIL | FAIL | PASS | AHRS1 | YES |
| ALL OTHER CONDITIONS | | | | | | | | | | IRU1 | YES |

X = Don't Care

INERTIAL SIGNAL DATA VOTER LOGIC – FLIGHT CONTROL SYSTEM AND PRIMARY FLIGHT DISPLAY

FIG 2A

| INLINE BITE TEST RESULTS | | | COMPARISON TEST RESULTS | | | | | VOTER OUTPUTS | |
|---|---|---|---|---|---|---|---|---|---|
| IRU1 | IRU2 | AHRS1 | AHRS2 | IRU1/IRU2 | IRU1/AHRS1 | IRU1/AHRS2 | IRU2/AHRS1 | IRU2/AHRS2 | AHRS1/AHRS2 | VOTED DATA | FAILURE WARNING |
| X | X | PASS | PASS | X | | | | | PASS | Average of AHRS1 & AHRS2 | NO |
| X | PASS | X | PASS | X | | | | PASS | FAIL | AHRS2 | NO |
| X | PASS | PASS | X | X | | | PASS | X | FAIL | AHRS1 | NO |
| PASS | X | X | PASS | X | X | PASS | | | FAIL | AHRS2 | NO |
| PASS | X | PASS | X | X | PASS | X | | | FAIL | AHRS1 | NO |
| ALL OTHER CONDITIONS | | | | | | | | | | AHRS1 | YES |

X = Don't Care

INERTIAL SIGNAL DATA VOTER LOGIC - STANDBY FLIGHT DISPLAY

SYSTEMS AND METHODS OF REDUNDANCY FOR AIRCRAFT INERTIAL SIGNAL DATA

BACKGROUND

In recent years, the aviation industry has continued numerous efforts to reduce cost and improve performance of navigation avionics and flight control systems while maintaining or improving the level of safety. For example, an inertial reference system (IRS) for an aircraft includes gyroscopes and accelerometers to provide data concerning the state of the aircraft. Some of these data measurements (including pitch, roll, attitude, and heading) are transferred to one or more avionics displays in the aircraft. In addition, IRS signal data are also used to augment the aircraft's flight control system and to navigate the airplane.

Typically, a large commercial aircraft includes primary and secondary (for example, primary and standby) attitude and heading displays. Pilots will use the standby display in situations where one (or more) of the primary displays fails. In one implementation, two or more IRS systems generate attitude and heading signals for the primary displays, while the standby display has self-contained gyroscopes and accelerometers to generate its own attitude and heading signals. It is important that the attitude and heading signals for the standby display use a dissimilar design from the IRS of the primary displays to avoid any possibilities that a common design failure could adversely affect both the primary and the standby displays.

In addition, each aircraft generally has a "minimum equipment list" (MEL) that defines the minimum complement of equipment, such as inertial equipment, that is required for takeoff. For example, the inertial minimum equipment list for large-scale commercial aircraft might include (1) at least one source of IRS signals for navigation (in an event of the loss of navigation signals via a global positioning system, or GPS); (2) at least three independent sources of flight control inertial signals for the flight control system; (3) at least three independent sources of attitude signals for the primary displays; and (4) at least one source of attitude signals for the standby display.

Commercial airlines want to avoid flight delays and flight cancellations (for example, those delays caused by a failure within the inertial system). It is therefore desirable to provide adequate redundancy within the inertial system to allow dispatch (that is, allow the airplane to takeoff) even after a failure has occurred in the inertial system. This allows the airline to continue flying the aircraft on its original schedule, and to defer the repair to a convenient time and location. However, this inertial system redundancy directly affects the cost of aircraft avionics. Thus, there is a need for improvements in redundancy for aircraft inertial signal data.

SUMMARY

The following specification provides for systems and methods of redundancy for aircraft inertial signal data. Particularly, in one embodiment, an aircraft inertial system comprises at least two inertial reference units (IRU) that provide a first set of inertial signal data for operating an aircraft and at least two attitude heading reference systems (AHRS) that provide a second set of the inertial signal data for operating the aircraft. At least one primary flight display receives the first and the second sets of the inertial signal data and a standby flight display receives at least the second set of the inertial signal data from at least one of the AHRS. When a single fault condition occurs, the primary flight display continues to operate with fail-operational redundancy from at least three independent sources of the inertial signal data comprising one or more combinations of the at least two IRU and the at least two AHRS.

In this particular embodiment, the aircraft continues to be dispatched after the single fault condition occurs in the inertial system. In addition, a flight management system (FMS) within the inertial system will function with the inertial signal data from at least one of the IRU, and the standby flight display operates using a different source of the inertial signal data that the source of the inertial signal data for the primary flight display.

BRIEF DESCRIPTION OF THE DRAWINGS

These and other features, aspects, and advantages are better understood with regard to the following description, appended claims, and accompanying drawings where:

Like reference characters denote like elements throughout the figures and text of the specification.

DETAILED DESCRIPTION

Embodiments disclosed herein relate to systems and methods of redundancy for aircraft inertial signal data. For example, at least one embodiment of an aircraft inertial system discussed herein includes two inertial reference units (IRU) that provide the inertial signal data to one or more primary flight displays, a flight control system, and a flight management system within the aircraft. The inertial system further includes two attitude heading reference systems (AHRS) to provide the inertial signal data to at least a standby flight display in addition to the primary flight displays and the flight control system.

In addition, attitude signals from the AHRS are "dissimilar" from the attitude signals from the IRU. This assures that attitude data will continue to be available to a flight crew of the aircraft even if there is a common design discrepancy that causes simultaneous failures with either the IRU or the AHRS. The AHRS are dissimilar from the IRUs, but the IRUs are not dissimilar from each other and the AHRS are not dissimilar from each other. In the applications contemplated herein, this dissimilarity requirement is relaxed under certain conditions where the aircraft dispatches with a failure in its inertial system.

Figure 1:
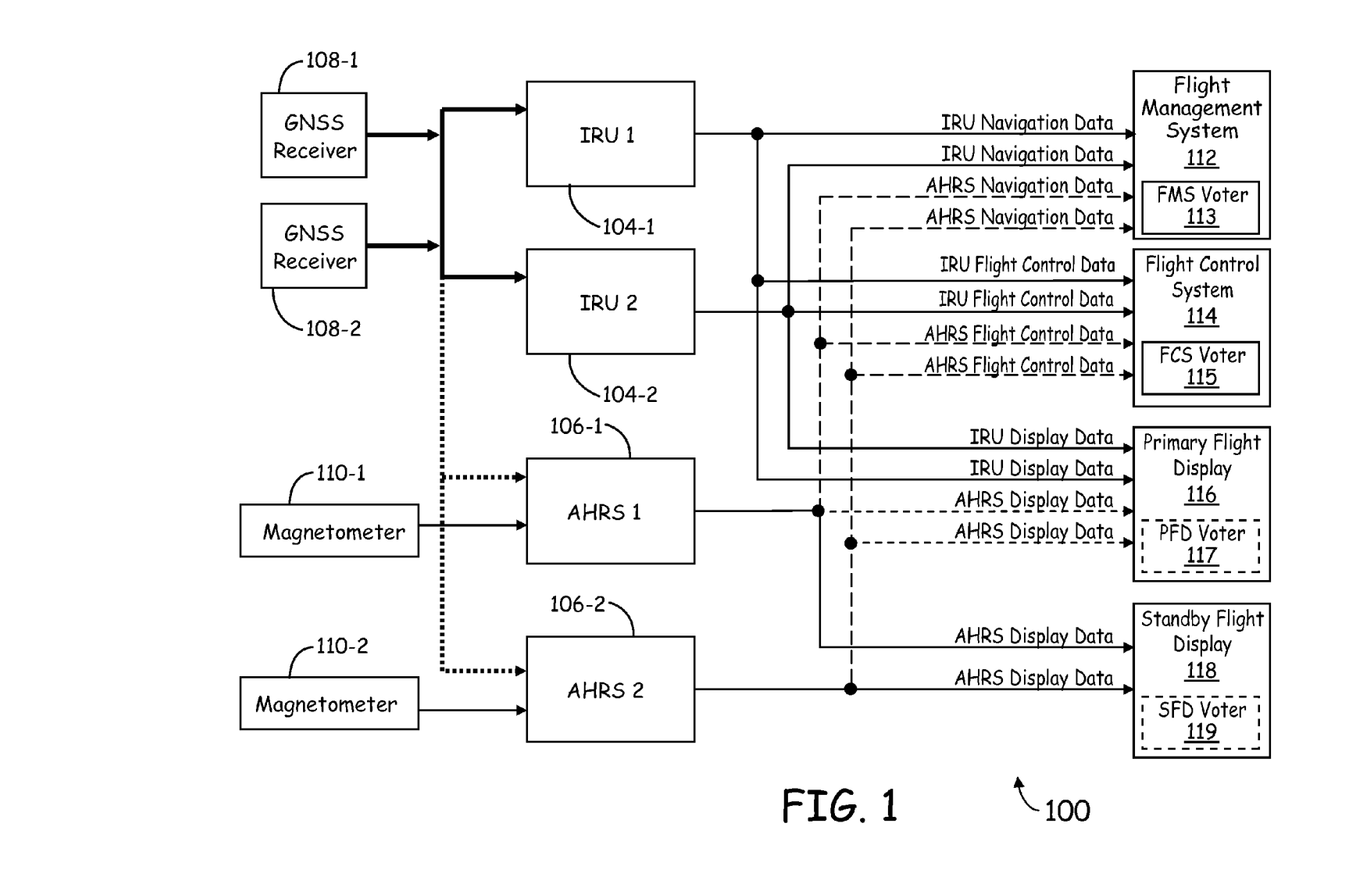
FIG. 1 is a block diagram of an embodiment of an aircraft avionics system.

FIG. 1 is a block diagram of an embodiment of an aircraft avionics system 100. The system 100 comprises a flight management system (FMS) 112, a flight control system (FCS) 114, a primary flight display 116, and a standby flight display 118. It is understood that the system 100 is capable of accommodating any appropriate number of redundant avionics subsystems (for example, one or more flight management systems 112, flight control systems 114, primary flight displays 116, and standby flight displays 118) in a single system 100 hosted by a particular aircraft. The flight control system 114 comprises a flight control computer to operate a plurality of flight control surfaces on the aircraft using, in one embodiment, an electronic "fly-by-wire" system. This system comprises a series of actuators coupled to the plurality of flight control surfaces to provide a desired flight operation in response to various criteria (including, without limitation, fuel economy, and the like).

In the example embodiment of FIG. 1, the flight management system 112 includes a voter module 113 for flight management signal data (labeled "FMS Voter") and the flight control system 114 includes a voter module 115 for flight control signal data (labeled "FCS Voter"). In one implementation, the primary flight display 116 includes an optional voter module 117 for primary flight display signals (labeled "PFD Voter") and the standby flight display 118 includes an optional voter module 119 for standby flight display signals (labeled "SFD Voter"). The operation of each of these voter modules 113, 115, and the (optional) voter modules 117 and 119 are discussed in further detail below.

The system 100 further comprises at least two IRUs 104-1 and 104-2 (labeled "IRU 1" and "IRU 2," respectively), at least two AHRS 106-1 and 106-2 (labeled "AHRS 1" and "AHRS 2," respectively), at least two global navigation satellite system (GNSS) receivers 108-1 and 108-2, and at least two magnetometers 110-1 and 110-2, each of which is described in further detail below. As shown in FIG. 1, the GNSS receiver 108 is communicatively coupled to the at least two IRUs 104-1 and 104-2 and (optionally) to the two AHRS 106-1 and 106-2. This improves the accuracy of AHRS signals and allows each of the AHRS 106 to transmit navigation data in addition to normal AHRS signal data. The at least two magnetometers 110-1 and 110-2 are communicatively coupled to the at least two AHRS 106-1 and 106-2, respectively.

As shown in FIG. 1, the IRUs 104-1 and 104-2 provide attitude and heading data to the primary flight display 116. The IRUs 104 further provide navigation data for the flight management system 112 and inertial flight control signals for the flight control system 114. In another embodiment, the IRUs 104 in FIG. 1 are replaced with Air Data Inertial Reference Units (ADIRUs). In yet another embodiment, the AHRS 106 in FIG. 1 are replaced with Air Data Attitude Heading Reference Systems (ADAHRS).

As discussed in further detail below, the AHRS 106-1 and 106-2 provide inertial flight control data for the flight control system 114. The AHRS 106 also provide attitude and heading data to the primary flight display 116, and the standby flight display 118. In one embodiment, the AHRS 106 also provide hybrid GPS/AHRS navigation data to the flight management system 112. In one embodiment, the at least two AHRS 106-1 and 106-2 use micro electro-mechanical system (MEMS) gyroscopes and accelerometers.

For purposes of this description, the navigation data provided to the flight management system 112 includes information about the aircraft's position, groundspeed, and track angle and other important information if such information is desired. The inertial signal data provided to the flight control system 114 includes, without limitation, information about the aircraft's pitch attitude, roll attitude, body rates, body accelerations, and (optionally) heading, groundspeed and track angle, and other important flight information if such information is desired. The inertial signal data provided to the primary flight display 116 and the standby flight display 118 include, without limitation, pitch attitude, roll attitude, and heading. In any event, for this example embodiment, the IRUs 104 and the AHRS 106 supply at least the flight management system 112 with at least the aircraft's current position (for example, as a function of the geographical position of the aircraft in latitudinal and longitudinal form), the near real-time direction (heading, track angle, and the like) of the aircraft in its flight path.

In operation, at least a portion of the inertial signal data from the at least two AHRS 106-1 and 106-2 are compared with the inertial signal data provided from the at least two IRUs 104-1 and 104-2. In one embodiment, these comparisons are made in the voter modules 113, 115, and 117 of the flight management system 112, the flight control system 114, and the primary flight display 116, respectively. For example, in at least one implementation, inertial signal data from the AHRS 106-1 and 106-2 are compared with the inertial signal data from the IRUs 104-1 and 104-2. In the example embodiment of FIG. 1, the inertial signal data from the AHRS 106-1 and 106-2 are digital electronic measurement signals. These digital electronic measurement signals are implemented as a form of "dissimilar" measurements using different navigation component measurements (for example, different gyroscopes, accelerometers, or software algorithms) than those provided by the IRUs 104-1 and 104-2.

In an event of a fault condition in the system 100, the AHRS 106-1 and 106-2 provide redundant inertial signal data to each of the flight management system 112, the flight control system 114, the primary flight display 116, and the standby flight display 118, as indicated by the dashed lines in FIG. 1. The AHRS 106-1 and 106-2 provide the standby flight display 118 with substantially similar display data (for example, the attitude and heading measurements) as determined by the IRUs 104-1. As a result, the inertial signal data provided within the system 100 are "quad-redundant" for the flight management system 112, the flight control system 114, and the primary flight display 116, and "dual redundant" for the standby flight display 118.

In the example embodiment of FIG. 1, the flight control system 114 and the primary flight display 116 receive the inertial signal data from each of the IRUs 104-1 and 104-2 and the AHRS 106-1 and 106-2. An inline self-test, commonly referred to as a Built-In Test Equipment (BITE) self-test, looks for situations where one of the IRUs 104 or the AHRS 106 detect an internal error, or (for example) situations where the flight management system 112 realizes that one of the IRUs 104 or one of the AHRS 106 has either stopped transmitting data or is transmitting incoherent or invalid data (for example, the parity of the digital transmission is bad). In one implementation, if one of the IRU 104-1 or 104-2 or one of the AHRS 106-1 or 106-2 experiences a fault condition that is detected by the inline self-test, the FCS voter 115 and the PFD voter 117 will discard the data from that particular IRU 104 or AHRS 106. If none of the IRUs 104 or AHRS 106 detects an inline self-test failure, but one of the IRUs 104 experiences a fault condition that causes the inertial signal data of the (faulted) IRU 104 to disagree with the inertial signal data from the other three inertial sources (that is, the remaining IRU 104 and the AHRS 106), the FCS voter 115 and the PFD voter 117 select the IRU signal data for the flight control system 114 and the primary flight display 116 that agrees with the AHRS sources.

In a similar embodiment, if none of the IRUs 104 or the AHRS 106 detect a failure in the inline self-test, and each of the IRUs 104-1 and 104-2 agree with one another and each of the AHRS 106-1 and 106-2 agree with one another (where the IRUs 104 do not agree with the AHRS 106), then the FCS voter 115 and the PFD voter 117 select the IRU signal data for the flight control system 114 and the primary flight display 116, respectively. Moreover, if each of the IRUs 104-1 and 104-2 experience fault conditions, the AHRS 106-1 and 106-2 provide the redundant inertial signals for the flight management system 112, the flight control system 114, the primary flight display 116, and the standby flight display 118.

In the system shown in FIG. 1, each of the IRUs 104-1 and 104-2 and the AHRS 106-1 and 106-2 independently measure the pitch angle of the airplane. In one implementation, each of the flight management system 112, the flight control system 114, and the primary flight display 116 "vote" for their inertial signal data using the FMS voter 113, the FCS voter 115, and the PFD voter 117, respectively. For example, if each of the IRU 104-1, the AHRS 106-1 and the AHRS 106-2 indicate a pitch angle to be about +5 degrees, and the IRU 104-2 indicates the pitch angle is about −15 degrees, then the FCS voter 115 and the PFD voter 117 will "vote" between the pitch angle measurements from each of these four inertial signal data sources to conclude the real pitch angle is about +5 degrees (in other words, the inertial signal data from the IRU 104-2 is faulted).

In one implementation, the flight control system 114 considers the pitch signal from any of the inertial signal data sources (for example, the IRU 104-1 and 104-2, and the AHRS 106-1 and 106-2) to be "unavailable" if a self-test indication signal from a particular inertial signal data source of FIG. 1 indicates a failure, or if that particular inertial signal data source has stopped transmitting the pitch signal. For example, if the pitch signal is available from both of the IRUs 104, and the pitch signal from each of the IRUs 104 compare within a prescribed tolerance threshold, then the flight control system 114 will use the average of the two pitch signals from both of the IRUs 104. Alternatively, if the pitch signal is unavailable from the IRU 104-1 and is available from the IRU 104-2 and from at least one of the AHRS 106, and each of the pitch signals from the IRU 104-1 and the at least one AHRS 106 compare within the prescribed tolerance threshold, the flight control system 114 will use the pitch signal from the IRU 104-1 (in this implementation, the IRU 104 is considered to be more accurate than the AHRS 106). As at least a second alternate example, if the pitch signal is unavailable from both IRUs 104 but is available from both of the AHRS 106-1 and 106-2, and the pitch signals from each of the AHRS 106-1 and 106-2 compare within the prescribed tolerance threshold, then the flight control system 114 will use the average of the pitch signals from each of the AHRS 106-1 and 106-2.

The configuration of the system 100, including the IRUs 104-1 and 104-2 and the AHRS 106-1 and 106-2 as shown in FIG. 1, provide a prescribed level of "dispatchability" and fault isolation for the aircraft having the system 100, referred to herein as "fail-operational" redundancy even after a failure in one of the IRUs 104 or one of the AHRS 106. This type of measurement redundancy from the IRUs 104-1 and 104-2 and the AHRS 106-1 and 106-2 provides a prescribed level of flight safety and reliability to allow the aircraft to takeoff and continue flying its normal route even after a single failure in an IRU 104 or AHRS 106, and it allows the airline to defer the repair until the next available service interval, and allows the aircraft to operate without added delays or cancellations (that is, the aircraft can continue to be "dispatched").

If the system 100 isolates a fault condition in at least one of the IRUs 104-1 or 104-2, the system 100 continues to function from at least three sources of the inertial signal data. For example, in one embodiment, the system 100 isolates a fault condition in at least one of the IRUs 104 or the AHRS 106 using the inline self-test (discussed above) in the IRU 104-1 (AHRS 106-1) or the IRU 104-2 (AHRS 106-2). In the example embodiment of FIG. 1, the flight control system 114 operates from at least three sources of valid or "known good" flight control data at the time the airplane dispatches. As discussed above, the FCS voter 115 determines which of the at least three sources of the "known good" flight control data, within the prescribed tolerance threshold for the inertial signal data, are used by the flight control system 114. In addition, and similar to the functionality of the flight control system 114, the primary flight display 116 determines a priority for receiving the inertial signal data from at least one of the IRU 104-1 and 104-2 over the AHRS 106-1 and 106-2 when each of the IRU 104-1 and 104-2 continue to provide the inertial signal data within the prescribed tolerance threshold.

Voter Logic

Figure 2A:
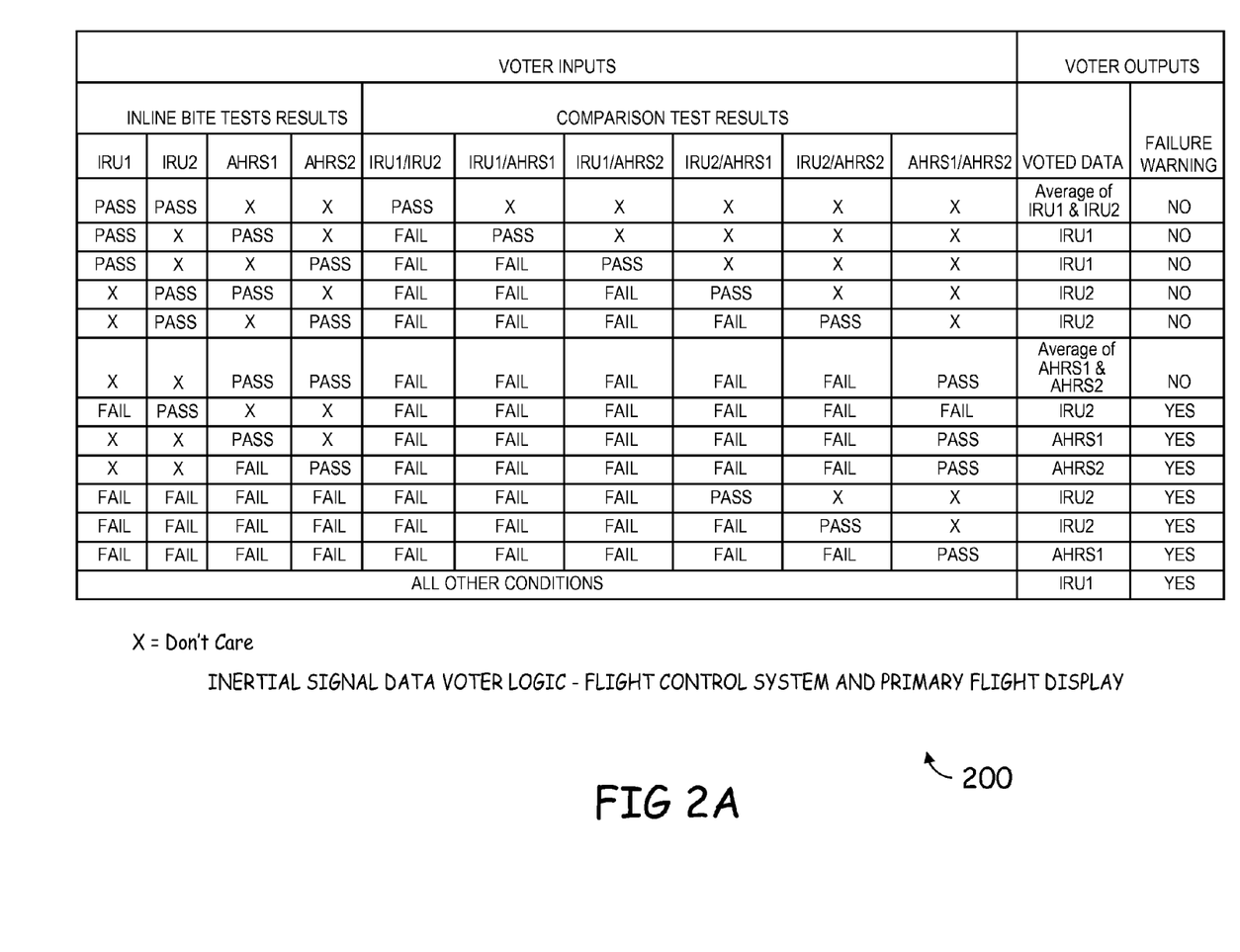
FIGS. 2A and 2B illustrates embodiments of voter logic for inertial signal data in the system of FIG. 1.
Figure 2B:
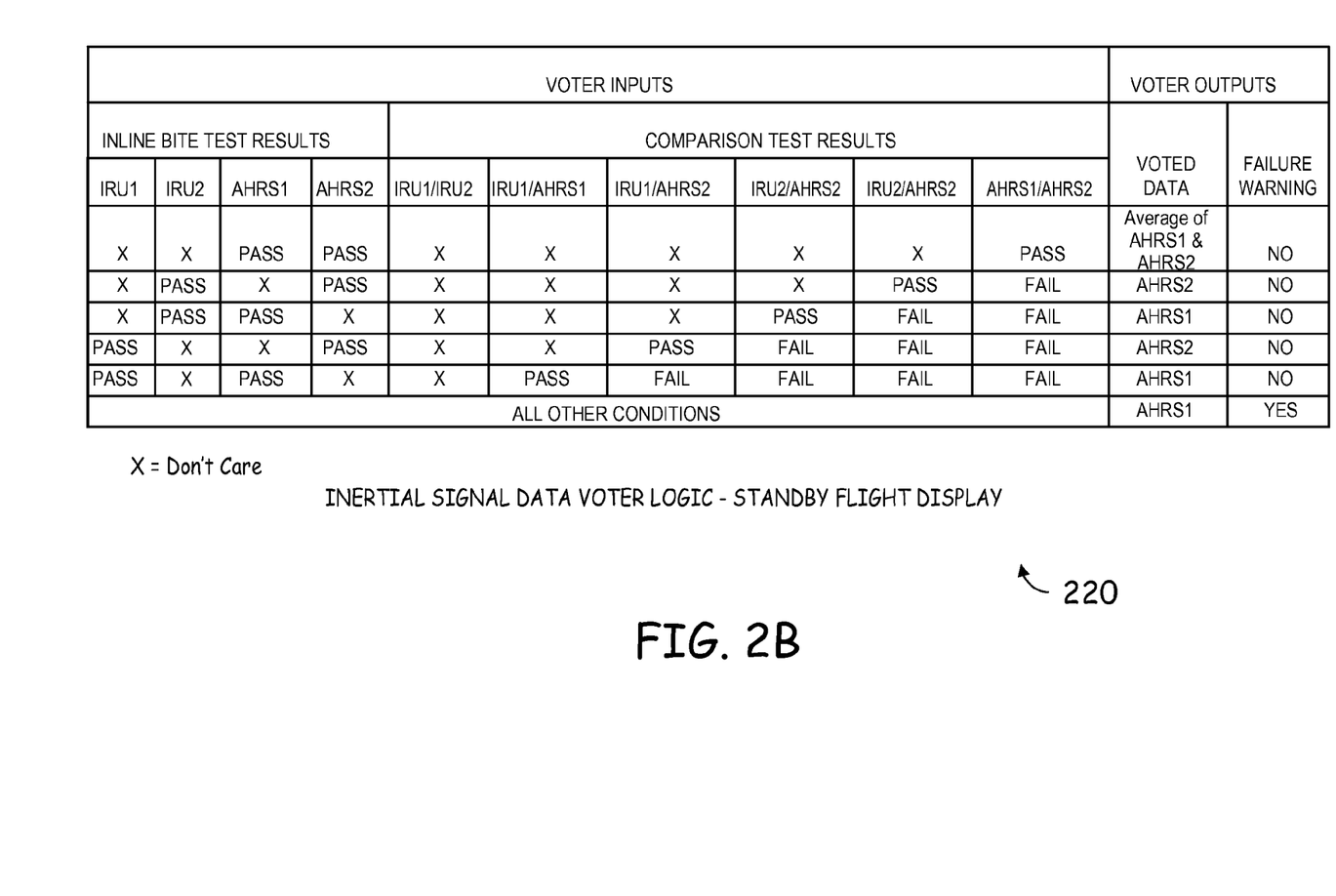

FIG. 2A illustrates an embodiment of a voter logic table, indicated generally at 200, for voting of inertial signal data in the flight control system 114 and the primary flight display 116 of the aircraft avionics system of FIG. 1. FIG. 2B illustrates an embodiment of a voter logic table, indicated generally at 220, for voting of inertial signal data in the standby flight display 118 of the system of FIG. 1. As shown in FIG. 2B, in one implementation, the table 220 provides representative logic for the SFD voter 119 for the standby flight display 118.

As shown in FIG. 2A, the logic table 200 addresses providing a prescribed level of dispatchability while operating the aircraft using at least one embodiment of the system 100. The table 200 provides representative logic for the FCS voter 115 and the PFD voter 117. The inputs to the voter are the inline BITE tests (discussed above) for each of the four sources of the inertial signal data (for example, the IRU 104-1 and 104-2, and the AHRS 106-1 and 106-2), and results of signal comparison tests between each of the six possible combination of two of the four inertial sources. The outputs from each of the FCS voter 115 and the PFD voter 117 are the voted data for use by the flight control system 114 and the primary flight display 116, and further include a "failure warning" discrete signal. The failure warning signal alerts the flight control system 114 and the flight crew to consider the voted data to be misleading.

In one implementation, as a form of "fail-safe" data integrity for the system 100, the inline BITE test for an inertial signal data source comprises BITE tests performed by that inertial signal data source; together with validity tests that each of the FCS voter 115 and the PFD voter 117 performs on that inertial signal data source. For example, the inline BITE test for the IRU 104-1 uses results of the BITE test performed by the IRU 104-1, as well as the validity tests by each of the FCS voter 115 and the PFD voter 117, to determine whether the IRU 104-1 has stopped transmitting signals or whether the inertial signal data from the IRU 104-1 has bad parity or if it fails a cyclic redundancy check (CRC). In addition, signal comparison tests are performed on each particular pairing of the inertial sources (labeled as shown in FIGS. 2A and 2B as IRU1, IRU2, AHRS1, and AHRS2). The signal comparison test passes when the data between the two sources of the inertial signal data match within the prescribed tolerance threshold.

In the example embodiment of FIG. 2A, the PFD voter logic for the PFD voter 117 is biased toward using signals from the IRUs 104-1 and 104-2 over using signals from the AHRS 106-1 and 106-2. The standby flight display 118, on the other hand, uses data from the AHRS 106-1 and 106-2. The voter logic table of FIG. 2A substantially eliminates any possibility that a single common-mode failure (for example a software error in the IRUs 104) will cause the same (but invalid) inertial signal data to be displayed on both the primary flight display 116 and the standby flight display 118.

As an alternative for the conditions where only a single IRU 104 has been isolated as failed, the PFD voter 117 uses the inertial signal data from the AHRS 106-1 and 106-2, and the standby flight display 118 uses inertial signal data from the non-failed IRU 104. This ensures that, after an IRU fails, the PFD voter 117 compares data from at least two sources of the inertial signal data (for example, the two AHRS 106-1 and 106-2), and issue a failure warning if the two AHRS 106-1 and 106-2 subsequently begin to disagree. The voter logic provided for the PFD voter 117 further ensures the standby flight display 118 uses a dissimilar set of the inertial signal data (for example, one of the IRU 104-1 or 104-2) from the set of inertial signal data intended for the primary flight display 116 (for example, one of the AHRS 106).

As an alternative, for the conditions where both of the IRUs 104-1 and 104-2 have failed, the PFD voter 117 will output attitude and heading signals from the AHRS 106-1 and the standby flight display 118 will use attitude and heading signals from AHRS 106-2. This alternative of the voter logic ensures that each of the primary flight display 116 and the standby flight display 118 uses different inertial sources after both IRUs 104-1 and 104-2 have failed to facilitate a flight crew's capability to isolate any subsequent AHRS failure.

In at least one embodiment of the system 100, the aircraft is dispatchable when there is at least one operable IRU 104 for the flight management system 112, three operable inertial sources for the flight control system 114 and the primary flight display 116, and one operable AHRS 106 for the standby flight display. The system 100 allows the airplane to be dispatched when there are no failures in the system 100, or even if there is a single IRU failure or single AHRS failure. In particular, the aircraft meets its prescribed dispatch requirements when there are no failures in the system 100 since the aircraft has the following: (1) two operable IRUs 104 for navigation (one more than required for dispatch); (2) four independent sources of inertial signal data for flight controls (the two IRUs 104-1 and 104-2 and the two AHRS 106-1 and 106-2), which is one more than required; (3) the same four independent sources of inertial attitude signals for fail-operational redundancy voting by the PFD voter 117; and (4) at least two sources of AHRS inertial attitude signals for the standby flight display 118 to provide a prescribed level of measurement dissimilarity between the standby flight display 118 (which uses AHRS-based inertial signal data) and the primary flight display 116 (which uses IRU-based inertial signal data). In this embodiment, the PFD voter 117 uses the average of the attitude signals from the two IRUs 104-1 and 104-2 if both of the IRUs 104 match within a prescribed tolerance threshold.

When the attitude signals from the two IRUs 104-1 and 104-2 do not match, the PFD voter 117 selects the attitude signal from the IRU 104 that matches with the inertial attitude signals from at least one of the AHRS 106. Accordingly, this method of voting assures that the attitude signal data for the primary flight display 116 are based on the IRU signals, not the AHRS signals. The operation of the PFD voter 117 ensures that a generic failure in one of the IRUs 104 or the AHRS 106 will not simultaneously corrupt both the primary flight display 116 and the standby flight display 118.

Continuing with this embodiment, the aircraft is also dispatchable with an AHRS failure. The aircraft will then have at least two operable IRUs 104-1 and 104-2 and at least one operable AHRS 106. This meets the aircraft's minimum equipment list (MEL) dispatch requirements because the aircraft has the following: (1) the two operable IRUs 104 for FMS navigation (one more than required for dispatch); (2) three independent sources of inertial signal data (for example, the two IRUs 104-1 and 104-2 and the at least one operable AHRS 106) for fail-operational redundancy voting by the FCS voter 115; (3) the same three independent sources of the inertial signal data for fail-operational voting by the PFD voter 117; and (4) at least one AHRS 106 for the standby flight display 118 to provide the prescribed level of measurement dissimilarity between the standby flight display 118 and the primary flight display 116. This particular embodiment of fail-operational redundancy voting for the primary flight display 116 is designed to be biased toward the IRU signals over the AHRS signals. For example, if one of the IRUs 104 fails, the PFD voter 117 will select the non-failed IRU (that is, the IRU 104 whose attitude signals most closely matches the attitude signals from the operable AHRS 106. As a result, the "voted" signal is based on the IRUs 104 and not on the AHRS 106).

In this embodiment, the aircraft is also dispatchable with an IRU failure. The aircraft will then have at least one operable IRU 104 and two operable AHRS 106-1 and 106-2. This meets the aircraft's MEL dispatch requirements because the aircraft has the following: (1) the at least one operable IRU 104 for navigation; (2) three independent sources of inertial signal data (the at least one operable IRU 104 and the two AHRS 106) for fail-operational redundancy voting by the FCS voter 115; (3) the same three independent sources of the inertial signal data for fail-operational redundancy voting by the PFD voter 117; and (4) at least one AHRS 106 for the standby flight display 118. In this situation, the primary flight display 116 and the standby flight display 118 are simultaneously susceptible to a common-mode failure in the at least one AHRS 106, however it is expected that the aircraft can still dispatch in this configuration due to the improbability of simultaneous occurrences of an IRU failure and a common-mode AHRS failure. When both of the IRUs 104-1 and 104-2 fail, both the primary flight display 116 and the standby flight display 118 are based on inertial signal data from the AHRS 106.

Similar to the embodiments discussed above, this particular embodiment of fail-operational redundancy voting is biased toward the IRU inertial signal data over the AHRS inertial signal data. For example, if one of the AHRS 106 fails and its attitude signals disagree with those from the other AHRS 106, and the at least one operable IRU 104 and the other AHRS 106 agrees with the at least one operable IRU 104, the PFD voter 117 will select the IRU attitude signals. Hence, the voted signal is based on the IRU inertial signal data and not on the AHRS inertial signal data. Likewise, if the IRUs 104 fail, the PFD voter 117 and the SFD voter 119 will each use the average of the attitude signals from the two AHRS 106-1 and 106-2 as shown in FIGS. 2A and 2B.

Figure 3:
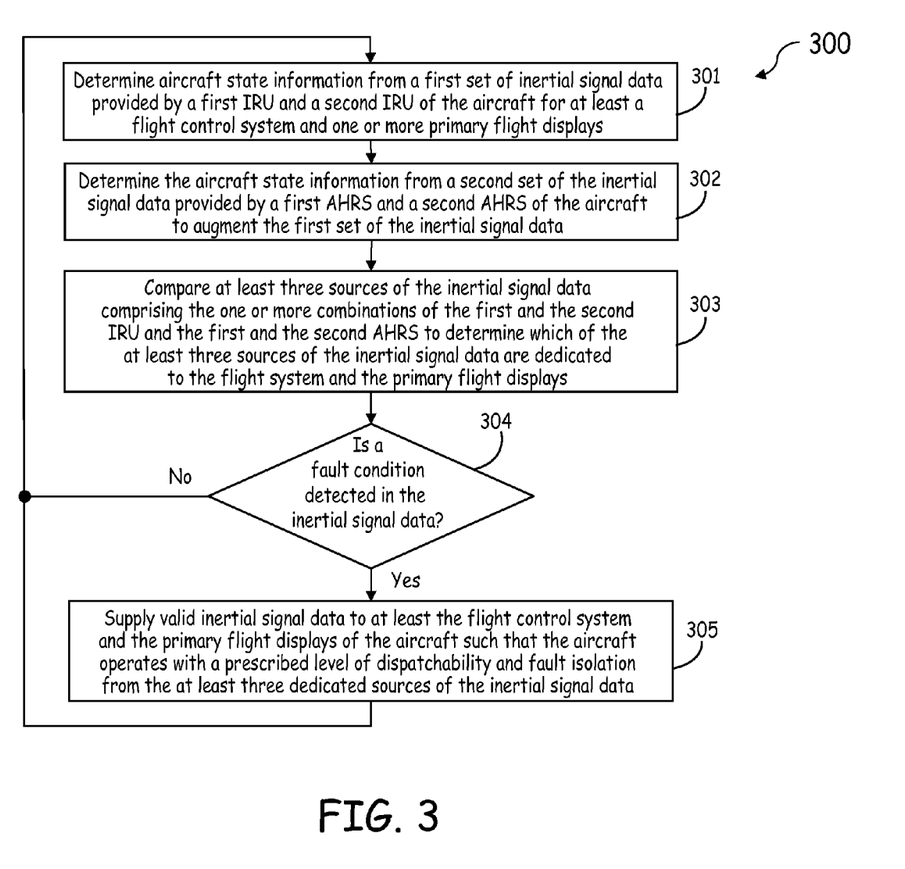
FIG. 3 is a flow diagram of an embodiment of a method for operating an aircraft with redundant inertial signal data.

FIG. 3 is a flow diagram of an embodiment of a method 300 for operating an aircraft with redundant inertial signal data. The method 300 addresses providing a prescribed level of dispatchability and fault isolation using at least one embodiment of the inertial system supplying redundant inertial signal data as shown in FIG. 1. In particular, at least one implementation described in the method of FIG. 3 provides comparatively dissimilar measurements between first and second sets of inertial signal data from the inertial system.

In the method shown in FIG. 3, the avionics system determines aircraft state information from the first set of inertial signal data provided by a first IRU and a second IRU of the aircraft for at least a flight control system and one or more primary flight displays of the aircraft (block 301). The inertial system further determines aircraft state information from a second set of the inertial signal data provided by a first AHRS and a second AHRS of the aircraft to augment the first set of the inertial signal data for the flight control system and the primary flight displays (block 302). The method 300 compares at least three sources of the inertial signal data comprising one or more combinations of the first and the second IRU and the first and the second AHRS to determine which of the at least three sources of the inertial signal data are dedicated to the flight control system and the primary flight displays (block 303). In one implementation, the inertial system determines which of the sources of the inertial signal data comprising the one or more IRU and AHRS combinations are dedicated to the primary flight displays and the flight control system using voter modules in each of the primary flight displays and the flight control system.

When a fault condition is detected in the inertial signal data (block 304), the inertial system supplies valid inertial signal data to at least the flight control system and the primary flight displays of the aircraft such that the aircraft operates with a prescribed level of dispatchability and fault isolation from the at least three dedicated sources of the inertial signal data (block 305). Once the aircraft is navigating from the valid inertial signal data, or when no fault condition is detected in the inertial signal data, the method 300 returns to block 301.

In one implementation, the inertial system provides valid navigation measurements to the flight management system of the aircraft and valid attitude and heading measurements to the standby flight display and the primary flight displays of the aircraft. The inertial system further provides known good flight control signal data, within a prescribed tolerance threshold, to the flight control system of the aircraft from at least three sources of the inertial signal data comprising the one or more combinations of the first and the second IRU and the first and the second AHRS.

In a similar implementation, the inertial system compares at least a portion of the second set of inertial signal data with the first set of inertial signal data to maintain the prescribed level of dispatchability of the aircraft. In one embodiment, the inertial system determines a priority for the flight control system and the primary flight displays to receive the inertial signal data from at least one of the IRU over the at least two AHRS when the at least two IRU continue to provide the inertial signal data within the prescribed tolerance threshold. In addition, the inertial system arranges the priority such that, when the inertial signal data from each of the at least two IRU match one another and are dissimilar from the inertial signal data from each of the at least two AHRS within the prescribed tolerance threshold, the primary flight displays select the first set of the inertial signal data over the second set of the inertial signal data.

The methods and techniques described herein may be implemented in a combination of digital electronic circuitry and can be realized by hardware, executable modules stored on a computer readable medium, or a combination of both. An apparatus embodying these techniques may include appropriate input and output devices, a programmable processor, and a storage medium tangibly embodying program instructions for execution by the programmable processor. A process embodying these techniques may be performed by the programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, the processor will receive instructions and data from at least one of a read only memory (ROM) and a random access memory (RAM). In addition, storage media suitable for tangibly embodying computer program instructions and data include all forms of non-volatile memory, and include by way of example, semiconductor memory devices; magnetic disks such as internal hard disks and removable disks; magneto-optical discs; optical discs, and other computer-readable media. Any of the foregoing may be supplemented by, or incorporated in, specially designed application-specific integrated circuits (ASICs).

This description has been presented for purposes of illustration, and is not intended to be exhaustive or limited to the embodiments disclosed. Variations and modifications may occur, which fall within the scope of the following claims.

What is claimed is:

1. An aircraft inertial system, comprising:
at least two inertial reference units (IRU) configured to provide a first set of inertial signal data for operating an aircraft;
at least two attitude heading reference systems (AHRS) configured to provide a second set of the inertial signal data for operating the aircraft;
at least one primary flight display configured to receive the first and the second sets of the inertial signal data;
a standby flight display configured to receive at least the second set of the inertial signal data from at least one of the AHRS;
wherein when a single fault condition occurs in the inertial system, the primary flight display continues to operate with fail-operational redundancy from at least three independent sources of the inertial signal data comprising one or more combinations of the at least two IRU and the at least two AHRS; and
wherein the standby flight display continues to operate using a different source of the inertial signal data than the source of the inertial signal data for the primary flight display.

2. The system of claim 1, further comprising:
a flight control system configured to receive the first and the second sets of the inertial signal data,
wherein the flight control system and the primary flight display continue to operate with the fail-operational redundancy from the at least three independent sources of the inertial signal data when the single fault condition occurs in the inertial system.

3. The system of claim 1, wherein the aircraft inertial system isolates the single fault condition in at least one of the first IRU and the second IRU based on an inline self-test of each of the first IRU and the second IRU.

4. The system of claim 1, wherein a voter module in the primary flight display is configured to:
determine, within a prescribed tolerance threshold, which of the at least three independent sources of the inertial signal data are routed to the primary flight display; and
provides valid inertial signal data with fail-safe integrity after any two sources of the inertial signal data have failed.

5. The system of claim 4, wherein the voter module in the primary flight display is further operable to:
detect subsequent failure conditions in any of the inertial signal data sources using results of an inline self test provided by each of the inertial signal data sources; and
indicate to the primary flight display that the resulting output is invalid.

6. A method for operating an aircraft with redundant inertial signal data, the method comprising:
determining aircraft state information from a first set of inertial signal data provided by a first inertial reference unit (IRU) and a second IRU for at least a flight control system and one or more primary flight displays of the aircraft;

determining the aircraft state information from a second set of the inertial signal data provided by a first attitude heading reference system (AHRS) and a second AHRS of the aircraft to augment the first set of the inertial signal data;

comparing at least three sources of the inertial signal data comprising one or more combinations of the first and the second IRU and the first and the second AHRS to determine which of the at least three sources of the inertial signal data are dedicated to the flight control system and the primary flight displays; and when a fault condition is detected in the inertial signal data, supplying valid inertial signal data to at least the flight control system and the primary flight displays of the aircraft such that the aircraft operates with a prescribed level of dispatchability and fault isolation from the at least three dedicated sources of the inertial signal data.

7. The method of claim 6, wherein comparing the at least three sources of the inertial signal data further comprises:
determining which of the sources of the inertial signal data comprising the one or more IRU and AHRS combinations are dedicated to the primary flight displays and the flight control system using voter modules in each of the primary flight displays and the flight control system.

8. The method of claim 6, wherein comparing the at least three sources of the inertial signal data comprises:
determining a priority for the flight control system and the primary flight display to receive the inertial signal data from at least one of the IRU over the at least two AHRS when the at least two IRU continue to provide the inertial signal data within a prescribed tolerance threshold; and
arranging the priority such that, when the inertial signal data from each of the at least two IRU match each other within the prescribed tolerance threshold, the primary flight displays select the first set of the inertial signal data over the second set of the inertial signal data.

9. The method of claim 6, wherein supplying the valid inertial signal data to at least the flight control system and the standby flight display of the aircraft comprises:
providing valid navigation measurements to a flight management system of the aircraft;
providing valid attitude and heading measurements to the standby flight display and the primary flight displays; and
providing known good flight control signal data, within a prescribed tolerance threshold, to the flight control system from at least three sources of the inertial signal data comprising the one or more combinations of the first and the second IRU and the first and the second AHRS.

10. The method of claim 6, wherein supplying the inertial signal data to at least the flight control system and the standby flight display of the aircraft further comprises:
providing comparatively dissimilar measurements from the first set of inertial signal data provided by the first IRU and the second IRU and the second set of inertial signal data provided by the first AHRS and the second AHRS to maintain the prescribed level of dispatchability of the aircraft.

11. An aircraft inertial system, comprising:
at least two inertial reference units (IRU) configured to provide a first set of inertial signal data for operating an aircraft;
at least two attitude heading reference systems (AHRS) configured to provide a second set of the inertial signal data for operating the aircraft;
a primary flight display configured to receive the first and the second sets of the inertial signal data;

a standby flight display configured to receive at least the second set of the inertial signal data from at least one of the AHRS; and
a flight control system configured to receive the first and second sets of the inertial signal data from one or more combinations of the at least two IRU and the at least two AHRS;
wherein when a single fault condition occurs in the inertial system, the flight control system continues to function from at least three independent sources of the inertial signal data comprising the one or more IRU and AHRS combinations.

12. The system of claim 11, wherein the flight control system uses at least three sources of the inertial signal data at the time the aircraft dispatches, and
wherein a voter module in the flight control system is configured to determine, within a prescribed tolerance threshold, which of the at least three independent sources of the inertial signal data are routed to the flight control system.

13. The system of claim 12, wherein the at least three sources of the inertial signal data comprise one of the at least two IRU and the at least two AHRS.

14. The system of claim 11, further comprising:
a flight management system configured to receive at least the first set of the inertial signal data from at least one of the at least two IRU,
wherein a voter module in the flight management system is configured to determine, within a prescribed tolerance threshold, which of the at least three sources of the inertial signal data are routed to the flight management system.

15. The system of claim 11, wherein the primary flight display is further configured to:
receive at least two sources of the inertial signal data comprising the one or more combinations of the at least two IRU and the at least two AHRS;
determine which of the at least two sources are dedicated to the primary flight display using a voter module in the primary flight display; and
wherein the primary flight display determines a priority for receiving the inertial signal data from at least one of the IRU over the at least two AHRS when the at least two IRU continue to provide the inertial signal data within a prescribed tolerance threshold, and
wherein the priority is arranged such that, when the inertial signal data from each of the at least two IRU match each other and are dissimilar from the inertial signal data from each of the at least two AHRS within the prescribed tolerance threshold, the voter module of the primary flight display selects the first set of the inertial signal data over the second set of the inertial signal data.

16. The system of claim 11, wherein the inertial signal data comprises attitude and heading measurements from the inertial system at the time the aircraft dispatches from each of the at least two IRU and the at least two AHRS.

17. The system of claim 11, wherein the standby flight display receives the second set of the inertial signal data from at least one of the AHRS, wherein the second set of the inertial signal data from the at least one AHRS is of dissimilar design from the first set of the inertial signal data from the at least two IRU.

18. The system of claim 11, wherein if each of the at least two IRU experience a fault condition, each of the primary flight display and the standby flight display uses an average reading of the inertial signal data from the at least two AHRS.

19. The system of claim 11, further comprising:
a magnetometer communicatively coupled to each of the at least two AHRS.

20. The system of claim 11, further comprising:
at least one global navigation satellite system receiver communicatively coupled to the at least two IRU.

* * * * *